(12) United States Patent
Strangman et al.

(10) Patent No.: US 7,306,860 B2
(45) Date of Patent: Dec. 11, 2007

(54) PROTECTIVE COATING FOR OXIDE CERAMIC BASED COMPOSITES

(75) Inventors: Thomas E. Strangman, Prescott, AZ (US); Bjoern Schenk, Phoenix, AZ (US); Paul R. Yankowich, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 210 days.

(21) Appl. No.: 10/909,026

(22) Filed: Jul. 30, 2004

(65) Prior Publication Data

US 2006/0024528 A1    Feb. 2, 2006

(51) Int. Cl.
B32B 9/00    (2006.01)

(52) U.S. Cl. .................. 428/702; 428/307.3; 428/432; 428/621; 428/632; 428/689

(58) Field of Classification Search ................ 428/621, 428/632, 307.3, 432, 689, 702
See application file for complete search history.

(56) References Cited

U.S. PATENT DOCUMENTS

| | | | | |
|---|---|---|---|---|
| 4,880,614 | A * | 11/1989 | Strangman et al. | 428/623 |
| 5,178,967 | A * | 1/1993 | Rosenfeld et al. | 428/697 |
| 5,562,998 | A * | 10/1996 | Strangman | 428/612 |
| 6,015,630 | A * | 1/2000 | Padture et al. | 428/632 |
| 6,117,560 | A * | 9/2000 | Maloney | 428/472 |
| 6,306,515 | B1 | 10/2001 | Goedjen et al. | |
| 6,387,539 | B1 | 5/2002 | Subramanian | |
| 6,541,134 | B1 | 4/2003 | Strangman et al. | |
| 6,610,419 | B1 | 8/2003 | Stamm | |
| 6,682,821 | B2 * | 1/2004 | Fukudome et al. | 428/446 |
| 2001/0019781 | A1 | 9/2001 | Hasz | |
| 2002/0172837 | A1 * | 11/2002 | Allen et al. | 428/632 |
| 2003/0044634 | A1 | 3/2003 | Kelly et al. | |
| 2003/0049470 | A1 | 3/2003 | Maloney | |
| 2003/0138660 | A1 | 7/2003 | Darolia et al. | |
| 2003/0152797 | A1 | 8/2003 | Darolia et al. | |
| 2003/0180571 | A1 | 9/2003 | Singh | |
| 2003/0224124 | A1 | 12/2003 | Lau et al. | |
| 2004/0028941 | A1 | 2/2004 | Lane et al. | |
| 2004/0175597 | A1 * | 9/2004 | Litton et al. | 428/702 |

FOREIGN PATENT DOCUMENTS

| | | |
|---|---|---|
| EP | 1008672 A1 | 6/2000 |
| EP | 1340542 A1 * | 9/2003 |
| JP | 8253875 A | 10/1996 |
| WO | WO9918259 A1 | 4/1999 |

* cited by examiner

*Primary Examiner*—Cathy F. Lam
(74) *Attorney, Agent, or Firm*—Ingrassia Fisher & Lorenz

(57) ABSTRACT

A layered structure includes a substrate comprising a layer of an oxide/oxide ceramic based composite material, a first oxide layer disposed directly on the substrate and formed from a material that has no greater than about 10% porosity and is substantially impermeable by water vapor, and a second oxide layer disposed directly on the first oxide layer and having a greater porosity than the first oxide layer. Either or both the first and second oxide layers of the coating system may be deposited using a plasma spraying process, a slurry deposition process which is followed by a sintering step, or an EB-PVD process.

20 Claims, 1 Drawing Sheet

PROTECTIVE COATING FOR OXIDE CERAMIC BASED COMPOSITES

TECHNICAL FIELD

The present invention relates to gas turbine engines and, more particularly, to ceramic composite materials that are useful for manufacturing engine components.

BACKGROUND

Gas turbine engines are subjected to high temperatures during operation and consequently include components made from insulative materials. A porous oxide/oxide composite is one example of a high temperature insulative structural material used for a gas turbine engine component such as a combustion liner. One type of oxide/oxide composite that can be readily used in a combustion liner consists of alumina fibers embedded in an alumina matrix. Since this composite may weaken or degrade at temperatures in excess of 2200° F., one or more layers of a high temperature porous insulation material, typically a more or less friable oxide-ceramic based material such as alumina, are commonly used to provide a thermal barrier layer on top of the structural ceramic composite.

Since the oxide/oxide ceramic composite and the insulating material are porous, both can be permeated by gases such as water vapor. Gas turbine engine combustors typically operate in a high-pressure environment where water vapor typically makes up about 10% of the gas flowing through the combustor. This water vapor results from both vapor entrained with the combustion air and from vapor produced as a product of the combustion reaction process. A gas-permeable composite can react with the pressurized water vapor to produce volatile hydroxides, such as $Al(OH)_3$ and $Si(OH)_4$, depending upon the base oxide in the composite system. Volatile hydroxides can cause surface recession and particle-particle bond weakening within the base composite. An uninhibited water vapor attack can eventually cause a combustion liner or other component made of an oxide/oxide composite to lose some of its thickness and strength.

Hence, there is a need for environmental barrier coating materials that protect a ceramic or other composite from both high temperature, pressurized water vapor, and other chemical attacks. There is a further need for a ceramic composite system that include multiple layers of high temperature insulation or coating materials that inhibit water vapor permeation of the porous composite substrate and are suitable for high pressure and high temperature environments.

BRIEF SUMMARY

The present invention provides a layered structure. Exemplary structures include gas turbine engine components such as a combustion chamber liner. The structure includes a substrate comprising a layer of an oxide/oxide composite material, which may or may not include an oxide ceramic based insulation layer, a first oxide layer disposed directly on the substrate and formed from a material that has no greater than about 10% porosity and, relative to the composite substrate, is substantially impermeable to the flow of water vapor, and a second oxide layer disposed directly on the first oxide layer and having a greater porosity and tolerance to water vapor than the first oxide layer.

In one embodiment, and by way of example only, the first oxide layer has a thickness ranging between about 1 and about 10 mils, and comprises alumina, oxides such as yttria, a garnet such as yttrium aluminum garnet, a monosilicate compound such as scandium monosilicate, yttrium monosilicate, and rare earth monosilicates such as ytterbium monosilicate, or a disilicate compound such as scandium disilicate, yttrium disilicate, and rare earth disilicates, such as ytterbium disilicate.

In another exemplary embodiment, the second oxide layer has a porous compliant microstructure. Preferably, the second oxide layer has a columnar microstructure having a plurality of segmentation gaps for enhanced strain accommodation. The second oxide layer may be formed from a material comprising stabilized zirconia, stabilized hafnia, a garnet such as $3Y_2O_3.5Al_2O_3$ and $3Yb_2O_3.5Al_2O_3$, or at least one high temperature zirconate such as $SrZrO_3$ and $La_2Zr_2O_7$.

The present invention also provides a method of manufacturing the above-described layered structure. The method comprises the steps of depositing the first oxide layer directly on the oxide/oxide substrate, and depositing the second, more porous oxide layer directly on the first oxide layer. In one exemplary embodiment the first oxide layer is deposited using a plasma spraying process. In another exemplary embodiment, the second oxide layer is deposited using a plasma spraying process. In another exemplary embodiment, one or both layers are deposited using a slurry deposition process followed by a subsequent sintering step. In another exemplary embodiment, one or both layers may deposited using an electron beam—physical vapor deposition (EB-PVD) process. In yet another embodiment, the method further comprises the step of forming a gas turbine engine component such as a combustion chamber liner from the layered structure.

Other independent features and advantages of the preferred structure and method will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

The present invention is a multi-layered thermal and chemical barrier coating system that includes materials that are able to insulate a base material such as a ceramic material. The system materials also provide a seal over the base material that protects the base material from unwanted penetration of chemicals such as salt compounds and water vapor. Since the coating materials reduce the temperature of the air-cooled substrate and shield the porous composite substrate from permeation of combustion derived water vapor, the coated composite system is useful to manufacture turbine engine components and other similar articles.

Figure 1:
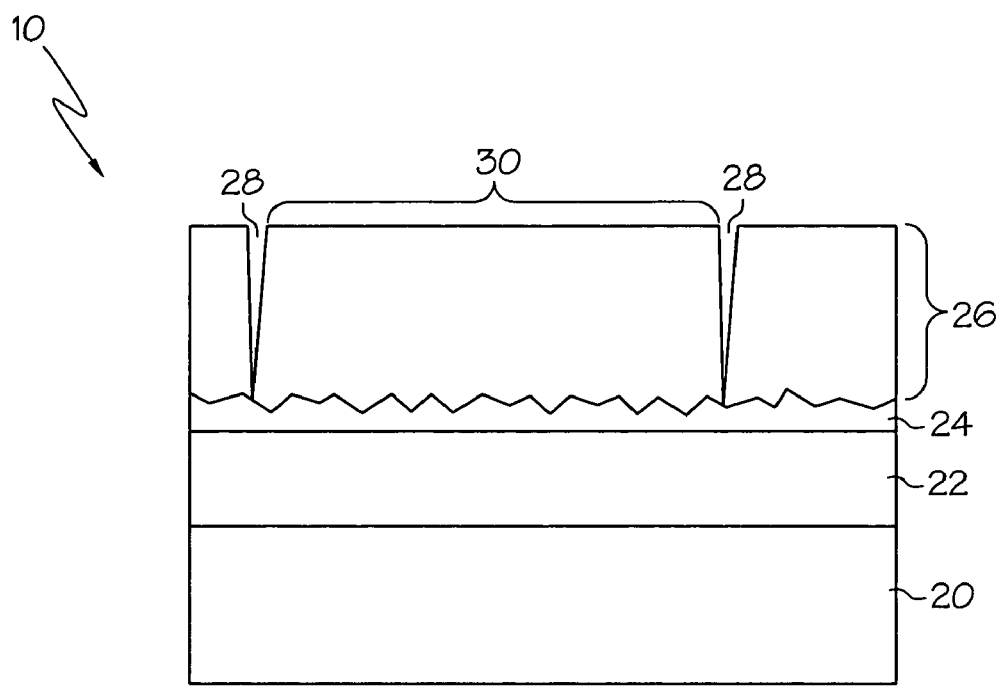
FIG. 1 is a cross section side view of a composite base material with an overlying dense bond coating and a top coating according to an embodiment of the present invention.

FIG. 1 is a cross section side view of a coated structure 10, including a composite base material 20 with protective coatings 24, 26 formed thereon, according to an embodiment of the present invention. The coated structure 10 illustrated in FIG. 1 also includes an insulation layer 22 between the base material 20 and the protective coatings 24, 26, although the insulation layer 22 is optional and is therefore included only as needed.

The base material 20 is the primary load-bearing structure for a component that functions in a high-temperature environment. An exemplary apparatus in which the component functions is a gas turbine engine, and one particular engine component for which the base material 20 is useful is a combustion chamber liner. Thus, before describing each constituent of the coated structure 10 in more detail, an exemplary combustor that may be used in a gas turbine engine will, for completeness of explanation, first be provided.

Figure 2:
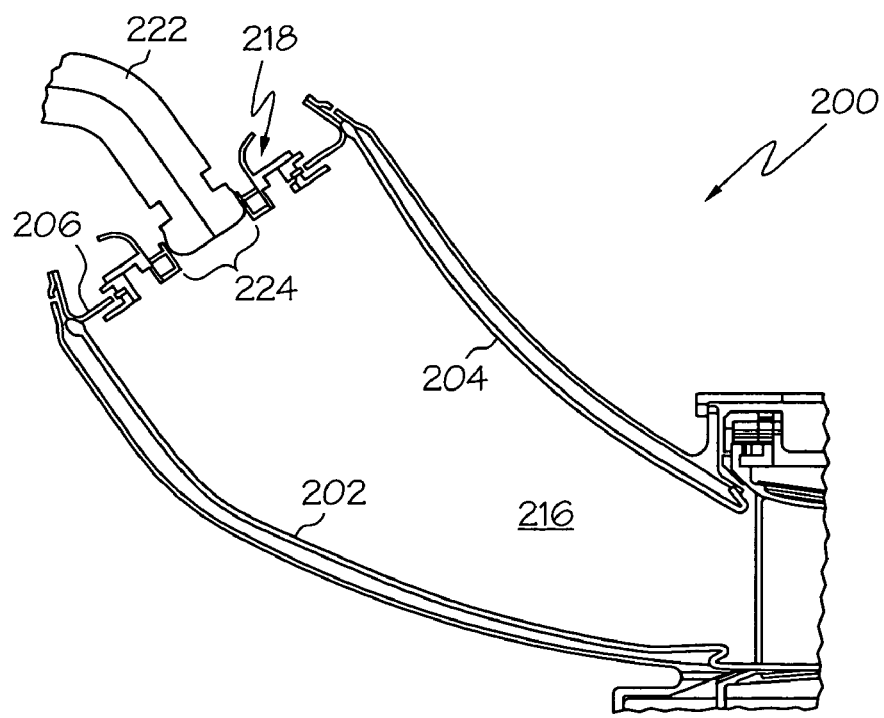
FIG. 2 is a cross section view of a portion of an exemplary annular combustor that includes components formed using the composite base material illustrated in FIG. 1.

Turning now to FIG. 2, the exemplary combustor is an annular combustor 200 and includes an inner annular liner 202, an outer annular liner 204, and a combustor dome 206 coupled to the inner 202 and outer 204 liners and forming a combustion chamber 216 therebetween. A fuel injector assembly 218 is also coupled to the combustor dome 206, and includes a fuel injector 222 that is mounted within a fuel inlet port 224. The fuel injector 222 is in fluid communication with a non-illustrated fuel source and supplies a spray of fluid to the fuel inlet port 224, where the fuel is mixed with air to form a fuel/air mixture. The fuel/air mixture is in turn supplied to the combustion chamber 216, where it is ignited by one or more non-illustrated igniters.

As previously mentioned, the base material 20 is useful as a combustion chamber liner such as the inner 202 and outer 204 liners. Of course, the base material 20, when thermally and chemically insulated with the protective coatings 24, 26 described below, can also be used to manufacture other gas turbine engine components such as other combustor components, shrouds, and airfoils, just to name a few. Further, the base material can be used to manufacture other objects that are subjected to high pressure, high temperature, or chemically volatile environments during use.

Returning once again to FIG. 1, the base material 20 includes a ceramic material, and in an exemplary embodiment the ceramic material is a porous composite such as an alumina fiber containing oxide ceramic based composite. An exemplary alumina fiber composite includes alumina fibers embedded in an alumina matrix. However, the base material 20 is not limited to alumina fiber composites. The protective coatings 24, 26 described below are compatible with, and provide protection for, other moisture-sensitive ceramic composite substrates such as silica-based composites and mullite-based composites.

As mentioned previously, the insulative layer 22 is optionally provided between the base material 20 and the protective coatings 24, 26. The insulative layer 22 is made from a material that is able to withstand temperatures and pressures in environments in which the coated structure 10 is utilized. If the protective coatings 24, 26 sufficiently insulate the base material 20 then the insulative layer 22 is not needed. Exemplary materials forming the insulative layer 22, when needed, include porous alumina, porous mullite, porous silica, and mixtures thereof. However, such porous materials are somewhat permeable to pressurized water vapor. Consequently, the insulative layer may not adequately protect the base material 20 and prevent it from reacting with water vapor to produce volatile hydroxides or other unwanted reaction products, which result in gaseous erosion of the composite. The protective coatings 24, 26 are provided over the insulative layer 22 for this reason.

The protective coatings 24, 26 thermally and chemically protect the base material 20. The first protective coating in the structure 20 is a dense bond coating 24 that is substantially impervious to water vapor, relative to the composite substrate, and therefore inhibits the free-flow of water vapor into the base material 20. Since water-rich combustion gases are highly impeded from permeating through the dense bond coating 24, the porous base material 20 is saturated with highly dry compressor discharge air when the engine is functioning.

The dense bond coating 24 is an oxide selected from compounds or compositions that are chemically compatible with the base material 20 or, if present, the insulative layer 22. The dense bond coating 24 is also selected from compounds or compositions that are chemically compatible with the second protective coating 26, described below. Suitable oxides and oxide compositions for the dense bond coating 24 include alumina, oxides such as yttria, garnets such as YAG (yttrium aluminum garnet having the formula $3Y_2O_3.5Al_2O_3$), rare earth garnets, such as $3Yb_2O_3.5Al_2O_3$, monosilicates such as scandium monosilicate, yttrium monosilicate, and rare earth monosilicates, such as ytterbium monosilicate, and disilicate compounds such as scandium disilicate ($Sc_2Si_2O_7$), yttrium disilicate ($Y_2Si_2O_7$), and rare earth disilicates, such as ytterbium disilicate ($Yb_2Si_2O_7$).

The dense bond coating 24 is applied using a method that substantially eliminates interconnected pores and makes the bond coating substantially impermeable to pressurized water vapor. A plasma spraying process creates a coating that is sufficiently dense to act as a gas flow barrier. Other processes may be used such as, for example, a CVD or physical vapor deposition process or any other process that creates a coating that is between about 90% and about 100% dense, meaning that the coating has a porosity of between about 0% and about 10%. The dense bond coating 24 effectively prevents combustion derived water vapor from entering the base material 10 when it is applied at a thickness of between about 1 and about 10 mils.

The second protective coating 26 in the structure 10 may include at least one oxide layer that may have a higher porosity (for compliance) than the dense bond coating 24. Preferably some of the porosity within protective coating 26 may be in the form of segmentation gaps 28, which further enhances compliance. The second protective coating may comprise at least one segmented columnar ceramic layer 26 that is disposed on the dense bond coating 22, and creates a thermal barrier that prevents the base material 20 from reaching a temperature at which its structure or functional utility is degraded. The columnar ceramic layer 26 is typically in the form of a plurality of substantially parallel columns 30 arranged approximately orthogonal to the surface of the base material 20. A plurality of segmentation gaps 28 are arranged substantially parallel to, and interposed between, adjacent columns 30.

The columnar ceramic layer 26 may include stabilized zirconia. According to one embodiment, the columnar ceramic layer 26 includes cubic or tetragonal yttria stabilized zirconia. The cubic yttria stabilized zirconia may include between about 7 and about 50 mole % yttria and between about 50 and about 93 mole % zirconia, preferably between about 7 and about 40 mole % yttria and between about 60 and about 93 mole % zirconia, and more preferably between about 10 and about 40 mole % yttria and between about 60 and about 90 mole % zirconia. According to another embodiment, the columnar ceramic layer 26 includes tetragonal yttria stabilized zirconia. The thickness of the columnar ceramic layer 26 typically ranges between about 5 and about 60 mils, but can be thinner or thicker according to need.

The columnar ceramic layer 26 may also include stabilized hafnia. According to one embodiment, the columnar ceramic layer 26 includes cubic or tetragonal yttria stabilized hafnia. The cubic yttria stabilized hafnia may include between about 12 and about 50 mole % yttria and between about 50 and about 88 mole % hafnia, preferably between about 15 and about 50 mole % yttria and between about 50 and about 85 mole % hafnia, and more preferably between about 18 to 40 mole % yttria and between about 60 and about 82 mole % hafnia.

A number of deposition processes may be used to form the columnar ceramic layer 26. The particular deposition process used to form the columnar ceramic layer 26 may vary according to the particular component to be coated, and the desired thickness of the columnar ceramic layer 26. For example, the columnar ceramic layer 26 may be deposited on relatively large components such as combustors and liners using a plasma spraying process. An exemplary plasma spraying process is described in U.S. Pat. No. 5,073,433, the disclosure of which is incorporated by reference herein in its entirety. One advantage to using this type of process is that the columnar ceramic layer 26 is segmented when the spraying process is completed. Alternatively, the ceramic layer 26 can be applied and segmented using the methods disclosed in U.S. Pat. Nos. 4,914,794 or 6,224,963, the disclosures of which are incorporated by reference herein in its entirety. As a further example, the columnar ceramic layer 26 may be applied using an EB-PVD process. An exemplary EB-PVD process is described in U.S. Pat. No. 5,514,482, the disclosure of which is incorporated by reference herein in its entirety. Dual layer structures can form the columnar ceramic layer as well, and U.S. application Ser. No. 10/621,981, filed Jul. 16, 2003, is incorporated by reference in its entirety for its teachings related to the columnar ceramic layer 26, including but not limited to teachings related to multi-level columnar ceramic structures.

The columnar layer 26 is porous and preferably includes the segmentation gaps 28 to accommodate thermal expansion without producing compressive in-plane stresses that might buckle the layer 26. Other materials that may be used to form the layer 26 include garnets such as $3Y_2O_3.5Al_2O_3$ and $3Yb_2O_3.5Al_2O_3$, and high temperature zirconates such as $SrZrO_3$ and $La_2Zr_2O_7$. Compared to compounds such as alumina or silica that make up the base material 20, the materials that form the columnar layer 26 are relatively inert to water vapor and can tolerate a high temperatures and high pressure environment such as that of an annular combustor. Further, although the columnar layer 26 is permeable to water vapor that is in the combustion gas, the gas velocity at the bonded interface between the columnar layer 26 and the dense bond coating 24 is effectively zero, which greatly minimizes the ability of water vapor to react with the dense bond layer 24. Also, an exemplary columnar layer 26 provides a thermal barrier that enhances the design, allowing the dense bond coating 24 to be designed to operate at a temperature below 2400° F., and the air-cooled oxide-oxide ceramic base material 20 is maintained at a temperature below 2200° F. The combined protective layers 24, 26 therefore provide a design solution to maintain the base material 20 in a thermally and chemically safe environment.

The above-described multi-layered thermal and chemical barrier coating system is suitable for use in many high temperature or high pressure environments. The coating system materials are able to thermally insulate an air-cooled base material and also provide a seal over the base material that protects the base material from unwanted penetration of water vapor or other unwanted chemicals. Because the coating materials inhibit the flow of water vapor within the composite substrate and are tolerant of high pressure and high temperature environments, the system is useful to manufacture not only turbine engine components, but other articles in need of thermal and chemical protection as well.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A layered structure, comprising:
   a substrate comprising a layer of an oxide/oxide ceramic composite material;
   a first oxide layer comprising alumina disposed directly on the oxide/oxide ceramic composite material from the substrate and formed from a material that has no greater than about 10% porosity; and
   a second oxide layer disposed directly on the first oxide layer, the second oxide layer being a columnar ceramic material having a plurality of segmentation gaps formed therein and having a greater porosity than the first oxide layer.

2. The layered structure of claim 1, wherein the first oxide layer further comprises at least one garnet selected from the group consisting of yttrium aluminum garnet and a rare earth aluminum garnet.

3. The layered structure of claim 2, wherein the first oxide layer further comprises ytterbium aluminum garnet.

4. The layered structure of claim 1, wherein the first oxide layer further comprises at least one mono- or disilicate compound selected from the group consisting of scandium disilicate, yttrium disilicate, a rare earth monosilicate compound, and a rare earth disilicate compound.

5. The layered structure of claim 4, wherein the mono- or disilicate compound is at least one compound selected from the group consisting of scandium mono- and disilicate, yttrium mono- and disilicate, and ytterbium mono- and disilicate.

6. The layered structure of claim 1, wherein the first oxide layer has a thickness ranging between about 1 and about 10 mils.

7. The layered structure of claim 1, wherein the second oxide layer comprises stabilized zirconia.

8. The layered structure of claim 1, wherein the second oxide layer comprises stabilized hafnia.

9. The layered structure of claim 1, wherein the second oxide layer comprises a garnet selected from the group consisting of $3Y_2O_3.5Al_2O_3$ and $3Yb_2O_3.5Al_2O_3$.

10. The layered structure of claim 1, wherein the second oxide layer comprises at least one high temperature zirconate selected from the group consisting of $SrZrO_3$ and $La_2Zr_2O_7$.

11. The layered structure of claim 1, wherein the second oxide layer comprises stabilized zirconia.

12. The layered structure of claim 1, wherein the second oxide layer comprises stabilized hafnia.

13. The layered structure of claim 1, wherein the second oxide layer comprises a garnet selected from the group consisting of $3Y_2O_3.5Al_2O_3$ and $3Yb_2O_3.5Al_2O_3$.

14. The layered structure of claim 1, wherein the second oxide layer comprises at least one high temperature zirconate selected from the group consisting of $SrZrO_3$ and $La_2Zr_2O_7$.

15. The layered structure of claim 1, wherein the substrate comprises an oxide ceramic-based insulation layer formed on the oxide/oxide ceramic composite material.

16. The layered structure of claim 1, wherein the structure is a gas turbine engine component.

17. The layered structure of claim 16, wherein the structure is a combustion chamber liner.

18. A layered structure, comprising:
   a substrate comprising a layer of an oxide/oxide ceramic composite material;
   a first oxide layer disposed directly on the substrate and formed from a material that has no greater than about 10% porosity, wherein the first oxide layer comprises at least one oxide selected from the group consisting of scandia, yttria, and a rare earth oxide; and
   a second oxide layer disposed directly on the first oxide layer and having a greater porosity than the first oxide layer.

19. The layered structure of claim 18, wherein the first oxide layer comprises ytterbia.

20. A layered structure, comprising:
   a substrate comprising a layer of an oxide/oxide ceramic composite material comprising a metal oxide matrix having metal oxide fibers embedded in the matrix;
   a first oxide layer comprising alumina disposed directly on the oxide/oxide ceramic composite material from the substrate and formed from a material that has no greater than about 10% porosity; and
   a second oxide layer disposed directly on the first oxide layer and having a greater porosity than the first oxide layer.

* * * * *